United States Patent Office 3,305,385
Patented Feb. 21, 1967

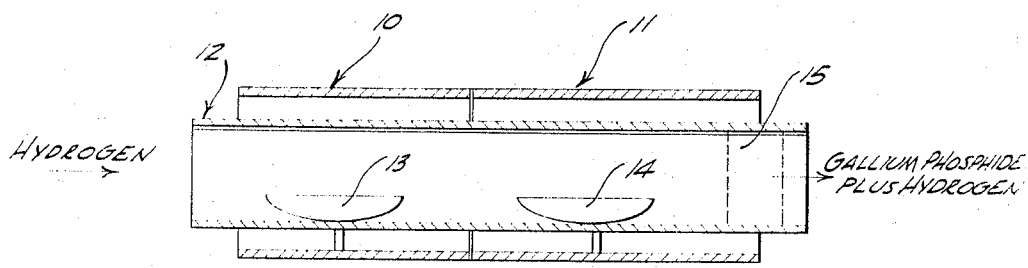

3,305,385
METHOD FOR THE PREPARATION OF
GALLIUM PHOSPHIDE
Frank A. Pizzarello, Santa Ana, Calif., assignor to Hughes Aircraft Company, Culver City, Calif., a corporation of Delaware
Filed June 27, 1963, Ser. No. 291,061
4 Claims. (Cl. 117—106)

This invention relates to a method of producing gallium phosphide suitable for use in fabricating semiconductor devices, and particularly to the production of suitably doped crystals of gallium phosphide for such use.

In the prior art, gallium phosphide has been produced by passing phosphorus vapor entrained in hydrogen over solid gallium oxide at about 700° C. This method has the disadvantage that gallium oxide of high purity, formed of pure gallium metal and oxygen, is required. In addition, this prior art method is restricted to the use of phosphorus vapor because vaporizable compounds of phosphorus generally cannot be used.

Gallium phosphide also can be made, as taught in the prior, art, by combining the vapors of elemental phosphorus and liquid gallium. However, growth of crystals of gallium phosphide from liquid gallium mother liquor is very slow and the gallium phosphide crystals produced contain occlusions of gallium as an undesirable impurity. Crystalline growth of gallium phosphide crystals from a stoichiometric mixture of gallium and phosphorus requires a phosphorus vapor pressure of the order of 15 to 20 atmospheres and a temperature of about 1500° C. These temperature and pressure conditions are very difficult and costly to achieve and maintain.

Accordingly, it is a primary object of this invention to provide a satisfactory method for the production of gallium phosphide crystals having suitable properties for use in semiconductor devices.

Another object of this invention is to provide such a method which can be conducted in inexpensive apparatus at ordinary pressures instead of in high pressure equipment at dangerously high pressures which are very costly to achieve.

A further object of this invention is to provide a method for the production of gallium phosphide crystals free from occlusions of gallium.

Still another object of this invention is to provide a flexible method for the production of gallium phosphide crystals or thin films which readily lends itself to doping of the crystals or films with desired amounts of various, selected doping agents.

Stated in general terms, the objects of this invention are attained by passing a mixture including a phosphorus-containing material such as vapors of phosphorus pentoxide, phosphorus oxychloride, phosphorus trichloride and elemental phosphorus, preferably carried in a carrier gas, such as hydrogen, argon, and the like, into contact with elemental liquid gallium and condensing and crystallizing the gallium phosphide produced to form single crystals of good quality. Either p-type or n-type crystals of gallium phosphide are produced by introducing the acceptor, or the donor, doping agents into the gallium, or into the gas phase reactant, preferably in the inert carrier gas, in an elemental vapor, or decomposable compound form, in the predetermined concentration to produce the desired, doped, semiconductor grade crystals.

A more detailed description of a specific embodiment of the invention is given with reference to the accompanying drawing, wherein:

FIG. 1 schematically shows a side elevational view, in section, of a reaction tube and furnace employed to conduct the reaction to produce the gallium phosphide crystals; and FIG. 2 is a flow sheet schematically illustrating the method of the invention conducted in the apparatus of FIG. 1.

A two temperature gradient furnace was used. The lower temperature region 10 was maintain in a temperature range from 250° to 320° C. The upper temperature region 11 was maintained in the range between 1000° and 1100° C. A quartz reaction tube 12, having a diameter of about 38 mm., was placed in the furnace as indicated.

Reaction tube 12 was provided with auxiliary equipment including a molecular sieve column through which the hydrogen carrier gas was passed to dry the gas. The inlet end of tube 12 was provided with a ground joint and a regulating stopcock. The outlet end of tube 12 also was provided with a ground joint and a gas bubbler containing silicone oil connected thereto. The purpose of this auxiliary equipment was to cause gas to flow through reaction tube 12, first passing through lower temperature region 10, and then through higher temperature region 11.

An Alundum boat 13, containing a mixture of equal parts by volume of phosphorus pentoxide and elemental phosphorus, was placed in a reaction tube 12 and in the lower temperature region 10 of the furnace. A quartz boat 14, containing pure elemental gallium, was placed into reaction tube 12, in the higher temperature region 11 of the furnace. Hydrogen carrier gas was directed into reaction tube 12 at the rate of approximately 100 cc. per minute. The hydrogen carrier gas was passed over the heated mixture of phosphorus pentoxide and phosphorus in boat 13, and formed a mixture of carrier gas, phosphorus pentoxide vapor and phosphorus vapor having a temperature of about 320° C.

The resulting hot mixture of carrier gas and vapors was passed over heated boat 14, containing molten gallium, and formed a hot mixture of carrier gas, phosphorus pentoxide vapor, phosphorus vapor and gallium having a temperature of about 1050° C. A chemical reaction, or series of reactions, took place in the upper temperature region 11 of the furnace, and the corresponding portion of tube 12, to produce gallium phosphide. The gallium phosphide product condensed and crystallized in an atmospherically cooled portion 15, of the quartz reaction tube 12. The wall of the cooled portion 15 of the reaction tube 12 was densely coated with a coat of fine gallium phosphide crystallites.

The crystallized gallium phosphide product was obtained both in the form of needles and plates free of gallium occlusions. Plates of about 2 mm. on an edge, and needles of about 1 cm. long by 0.5 mm. wide were deposited in the cooled portion 15, of reaction tube 12. The plates were of sufficient size to be suitable for the fabrication of diodes therefrom. A yield of about 60%, based upon the amount of gallium consumed, was obtained.

A series of chemical reactions is believed to take place in the reaction tube 12 as the carrier gas and phosphorus-containing vapors pass through the two regions of the tube over the two heated boats 13 and 14. In the lower temperature region of tube 12, near boat 13, phosphorus pentoxide dissociation probably takes place as follows:

$$2P_2O_{5(g)} \rightarrow P_{4(g)} + 5O_{2(g)}$$

In the higher temperature region of tube 12, near boat 14, liquid gallium is probably partially oxidized to produce gallium suboxide vapor as follows:

$$4Ga_{(l)} + O_{2(g)} \rightarrow 2Ga_2O_{(g)}$$

Also, in the higher temperature region of tube 12, the gallium suboxide vapor probably rapidly reacts with the excess of elemental phosphorus vapor to produce gallium phosphide vapor as follows:

$$2Ga_2O_{(g)} + P_{4(g)} \rightarrow 4GaP_{(g)} + O_{2(g)}$$

Elemental phosphorus is added to boat 13 to insure the presence of an excess of elemental phosphorus vapor in the high temperature region of tube 12. In condensation region 15, the gallium phosphide vapor condenses to produce the gallium phosphide crystallite product.

Similar chemical reactions take place when boat 13 is charged with phosphorus trichloride and elemental phosphorus, probably as follows:

$$4PCl_{3(g)} \rightarrow P_{4(g)} + 6Cl_{2(g)}$$
$$2Ga_{(l)} + Cl_{2(g)} \rightarrow 2GaCl_{(g)}$$
$$4GaCl_{(g)} + 4P_{(g)} \rightarrow 4GaP_{(g)} + 2Cl_{2(g)}$$

Instead of crystallizing the gallium phosphide product in condensation region 15, clear films of gallium phosphide can be deposited directly on insulator substrates, such as quartz, from the gallium phosphide vapor-containing mixture of carrier gas and vapors produced in the vicinity of boat 14. The thus deposited clear films of gallium phosphide are useful for the production of thin film active devices, including electroluminescent devices.

Suitably doped gallium phosphide crystals or films for various semiconductor devices, and thin film devices, can be produced by the use of the method of the invention. In one embodiment, the desired doping agent is introduced into the system by alloying the desired doping material, in the desired amount, with the gallium to be used in the chemical reaction. For example, an empirically determined amount of elemental zinc acceptor in gallium phosphide is dissolved in the gallium used in boat 14. Gallium phosphide product, with the desired amount of acceptor doping, is produced in the manner described hereinabove. Similarly, gallium phosphide product, doped with the desired amount of tellurium, a donor doping agent, is prepared by dissolving a predetermined amount of tellurium in gallium phosphide in the gallium used in the method of the invention described hereinabove.

Obviously, many other modifications and variations of the present invention are possible in the light of the above teachings. It is therefore to be understood that within the scope of the appended claims the invention can be practiced otherwise than as specifically described.

What is claimed is:
1. A method for the production of gallium phosphide which comprises the steps of forming a mixture of vapors of phosphorus and phosphorus-containing materials selected from the group consisting of phosphorus pentoxide, phosphorus oxychloride and phosphorus trichloride, mixing the resulting phosphorus-containing vapors with a carrier gas by vaporizing in a heating chamber into a stream of the carrier gas, passing the resulting carrier gas mixture into contact with liquid gallium at a temperature above 1000° C., passing the gas stream into a cooling zone and cooling the resulting reaction mixture to crystallize therefrom gallium phosphide product, and recovering the gallium phosphide crystalline product.

2. A method for the production of gallium phosphide according to claim 1, wherein the phosphorus-containing material mixture consists of equal parts by volume of phosphorus pentoxide and elemental phosphorus.

3. A method for the production of gallium phosphide according to claim 1, wherein the gallium phosphide vapor-containing carrier gas product mixture is contacted by a substrate in the cooling zone to produce thereon a film of gallium phosphide.

4. A method for the production of gallium phosphide which comprises the steps of forming a mixture of vapors of phosphorus pentoxide and elemental phosphorus at a temperature from about 250° to about 320° C., mixing the resulting mixture of vapors with a stream of hydrogen carrier gas, passing the resulting carrier gas mixture into contact with liquid gallium at a temperature from about 1000° to about 1100° C., cooling the resulting reaction mixture to crystallize therefrom gallium phosphide product, and recovering the gallium phosphide crystalline product.

References Cited by the Examiner

UNITED STATES PATENTS 3,206,406  9/1965  Barkemeyer et al. ____ 23—204

FOREIGN PATENTS 1,130,421  5/1962  Germany.

ALFRED L. LEAVITT, *Primary Examiner.*

WILLIAM J. JARVIS, *Examiner.*